June 13, 1972   J. L. DEVITT ET AL   3,669,746
SEPARATORS FOR SECONDARY ALKALINE BATTERIES HAVING
A ZINC-CONTAINING ELECTRODE
Filed Aug. 3, 1970

INVENTORS:
JOHN L. DEVITT
DONALD H. McCLELLAND
BY Curtis H. Castleman Jr.

United States Patent Office 3,669,746
Patented June 13, 1972

3,669,746
SEPARATORS FOR SECONDARY ALKALINE BATTERIES HAVING A ZINC-CONTAINING ELECTRODE
John L. Devitt, Denver, and Donald H. McClelland, Littleton, Colo., assignors to The Gates Rubber Company, Denver, Colo.
Filed Aug. 3, 1970, Ser. No. 62,225
Int. Cl. H01m 43/02, 3/00
U.S. Cl. 136—30
16 Claims

ABSTRACT OF THE DISCLOSURE

A sealed or resealably safety-valved alkaline zinc electrode-containing battery cell is disclosed employing a multi-layer separator material which is composed of:
(1) A first layer in close engagement with the zinc electrode, microscopically homogeneous, non-reticulated, highly absorbing and retentive of electrolyte, and providing a uniformly wetted interface with the zinc electrode substantially lacking occluded voids;
(2) A second layer, contiguous to the opposite polarity electrode, which is composed of the same material as the first layer, or of a more porous, reticulated and less-retentive material than the first layer; and optionally,
(3) A third layer, interposed between the first and second layers, of a semi-permeable membranous layer.
The net effect of this multi-layer separator is to provide a variance in separator material characteristics normally to and transversely between the electrodes.

BACKGROUND OF THE INVENTION

Figure 1:
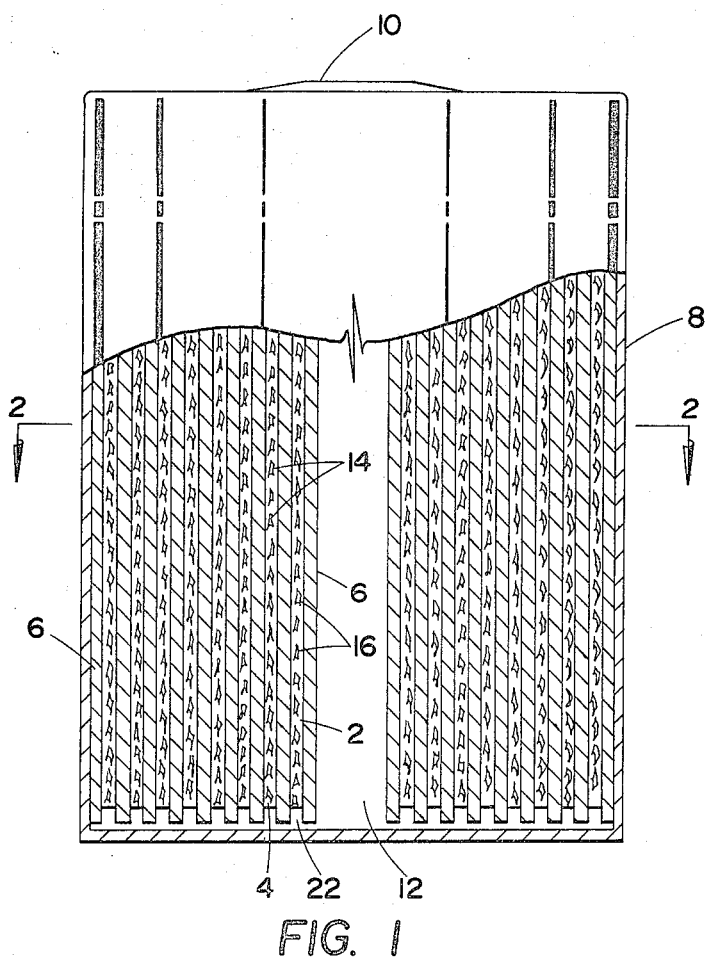

This invention relates to sealed or resealably safety valved alkaline secondary battery cells having zinc-containing anodes, and more particularly to multiple layer separator configurations employed in the cells. The most pertinent prior art known to the applicants may be found in United States Patent Office Sub-Class 136—30.

Secondary alkaline cells having zinc-containing anodes, such as nickel/zinc, silver/zinc, and manganese dioxide/zinc are known to possess certain desirable characteristics such as high cell voltages, high power density and accompanying low weight requirements, and low cost in comparison with conventional cells containing cadmium or other materials as a substitute for zinc. However, heretofore, a major drawback that has plagued zinc cells has been the relatively low number of charge/discharge cycles the cells would accommodate before losing electrochemical activity. The phenomenon of "treeing," i.e. dendritic growth of zinc deposits transversely in tree-like branches from the zinc electrode through the adjacent separator to the opposite polarity electrode, causes short circuiting of the cell to occur with a consequent reduction in cell life.

We have found that dendritic growth within zinc electrode-containing alkaline secondary battery cells is greatly retarded if the separator structure and its relative orientation within the battery cell meets the following criteria:
(1) The separator layer immediately adjacent to the zinc electrode must be non-reticulated, microporous, and microscopically uniform. Furthermore, the separator layer must be highly retentive and absorbent of electrolyte within its pores and interstices to provide a uniformly electrolyte-wetted surface along and surfaces parallel to the interface of the zinc electrode. Heretofore, separators employed in the prior art utilize highly porous fibrous materials such as fiber glass, porous papers such as Viskon (manufactured by the Chicopee Mills Corporation), membranous materials such as cellophane or relatively non-absorptive layers such as Pellon (a registered trademark of the Pellon Company).

(2) It is important in preventing or minimizing dendritic growth to maintain an interface between the zinc electrode and the separator which contains substantially no occluded voids or otherwise accommodates a localized excess of electrolyte along this interface. To avoid or minimize such discontinuity along the interface, it is important to apply a certain minimum pressure to the stack of electrodes and included separator layers. Under these conditions, voids will be eliminated or at least minimized if the separator layer intimately follows the contour of the zinc electrode.

(3) The amount of electrolyte within the cell should be in amount only sufficient to permit electrolytic conduction between the plates. Excess accumulation of electrolyte (containing zincate ions) greatly enhances dendritic growth. This required "starved" electrolyte condition within the cell serves the dual purpose of promoting oxygen recombination at the zinc-containing electrode, which prevents cell pressure build-up, and prolongs the life of the cell, and secondly permits oxidation of the dendrites, which may be branching out from the zinc electrode.

(4) While a cell having a separator configuration meeting the above three requirements may be subjected to a number of charge and discharge cycles, it has been found that the use of a plurality of separator layers in which there is a major variance in the characteristics of these layers in the transverse (normal) direction between the electrodes of opposite polarity is advantageous. The interfaces (discontinuities) between separator layers tend to act as barriers or obstructions to dendritic growth through the interface.

The following enumerated prior art references pertain to rechargeable alkaline cells having zinc electrodes and is generally directed to alleviating this problem of dendritic growth. However, inferior cycle life of these cells is probably attributable to their particular separator configurations which are deficient for the purposes of the present invention in lacking one or more of the above enumerated four criteria:

United States Patents 2,511,887; 2,594,709; 3,053,924; 3,226,260; and "Nickel-Zinc Cells," 21st Annual Power Sources Conference, PSC Publications, p. 70–79.

It is a primary object of the present invention to produce zinc-containing rechargeable alkaline cells in which dendritic growth is minimized by meeting each of the above four requirements for a multiple-layer separator configuration.

It is another object of the invention to produce alkaline cells capable on the average of a cycle life of at least 200 cycles.

It is a further object to form a cell of maximum energy capacity per unit volume of cell and in which the contents of the cell form an integral, non-self-supporting structure.

It is still a further object to produce a high performance cell which retains high voltages upon successive charge applications. It is another object to produce a cell which does not appreciably heat up on charge and overcharge.

These and other objects are obtained by employing the cell and its method of production according to the present invention as described herein.

SUMMARY OF THE INVENTION

Briefly described, the invention comprises a multilayer separator material for a sealed or semi-sealed alkaline zinc electrode-containing battery cell. The first separator layer adjacent to the zinc electrode is microscopically homogeneous and uniform, non-reticulated, highly absorbing and retentive of electrolyte, and provides a uniformly wetted interface with the zinc electrode, substantially lacking occluded voids, when placed in intimate, pressure engagement with the zinc electrode.

The second separator layer, contiguous to the opposite polarity electrode (e.g. nickel or silver-containing) may be of the same or similar material as the first layer, or may be composed of a more porous, fibrous and relatively non-retentive material as compared with the first layer.

A third separator layer, preferably of a semi-permeable membranous layer, is interposed between the first and second layers, in the case where the layers are made of the same or similar material. If the first and second layers are composed of different materials, then this third, membranous layer may optionally be used.

The net effect of the multi-layer separator is to provide a maximum variance in separator material character in the transverse direction between the electrodes. This transverse variance, the particular separator materials employed, starved electrolyte condition and pressure engagement and intimacy of the cell contents combine to significantly retard zinc dendritic growth between electrodes of the cell and greatly enhance its cycle life.

Silver-zinc, manganese dioxide and more preferably nickel-zinc cells, may be used in place of silver cadmium or nickel cadmium cells in nearly all of the conventional applications to which these cadmium cells are put, including use in portable instruments such as ohmmeters, oscilloscopes, in communications equipment, and in photographic applications. The nickel-zinc battery is of particular interest due to the ready availability and inexpensiveness of the raw materials used in the cell formulation, the fact that the cell may be oriented in any desired position during use, and its high voltage and energy density properties. The unique advantage of the present invention is the relatively long cycle life to which the cells may be put, usually averaging 200 discharge/charge cycles or more before the cell is no longer useful.

BRIEF DESCRIPTIONS OF THE DRAWINGS

Figure 3:
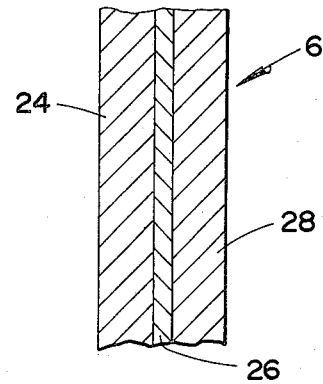
Figure 4:
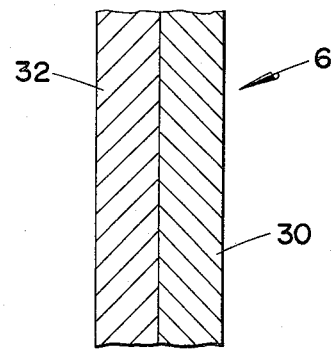
Figure 2:
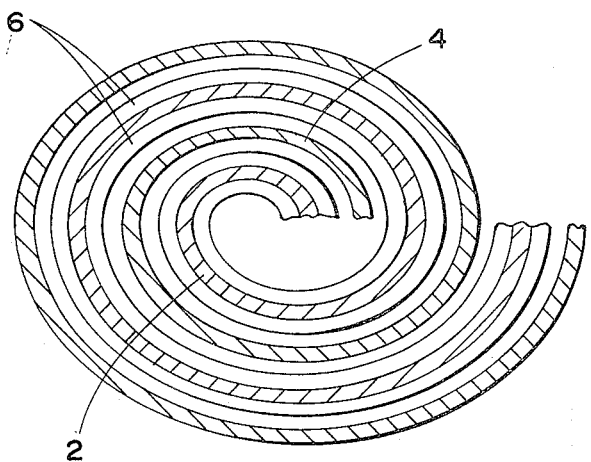
Figure 5:
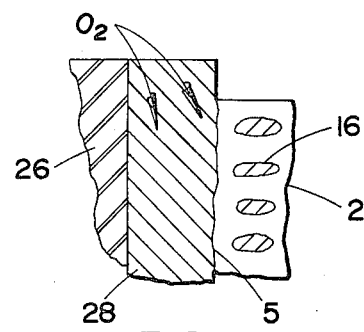

In the drawings, FIG. 1 is a partial cutaway view of a vented spirally wound nickel/zinc cell according to the present invention; FIG. 2 is a cross-sectional view of the cell of FIG. 1 taken along 2—2; FIG. 3 is an enlarged view of a three layered separator; FIG. 4 is a similar view of a two layered separator according to the invention; and FIG. 5 depicts an enlarged vertical sectional view of the separator/zinc-electrode interface.

PREFERRED EMBODIMENTS OF THE INVENTION

(1) Electropositive plate

While the invention is particularly adapted to cells having zinc electrodes and the associated dendrite growth problem, the opposite polarity electrode contains active material more electropositive than zinc e.g. Ag, silver oxide, manganese dioxide, oxygen gas, nickel oxides, et cetera. The following description will pertain to the use of nickel, although the invention is not so limited and should be broadly construed.

The finished nickel-oxide positive electrode is preferably, though not limited to, a flexible non-self-supporting structure capable of being rolled, packed or formed into a desired pressurized relationship within the cell container. Various types of nickel electrodes used in conventional nickel-cadmium cells as disclosed in the literature are generally suitable for use in this invention. For instance, impregnated electrodes are suitably made by using a porous electrically-conductive substrate comprising nickel metal dust sintered to a wire mesh nickel screen or "expanded mesh." This porous substrate is then conventionally impregnated with a solution of nickel nitrate and then immersed in a potassium hydroxide solution together with a counterelectrode to enable the basic solution to slowly diffuse into the substrate pores, precipitating nickelous hydroxide within the pores in situ. Another known method of producing nickel electrodes comprises securing particulate nickelic hydroxide (e.g. as prepared by the process of United States Pat. 3,489,664 to Popat, et al.) to an electrochemically active metallic substrate with the aid of a plastic binder.

It is preferred when using the aforementioned impregnated electrode, to impregnate a thin, highly reversible layer of nickel hydroxide on the substrate. Extreme physical electrochemical reversibility is desired to accommodate a large number of charge/discharge cycles. However, since the life of the nickel-zinc cell generally depends on the relatively shorter life of the zinc electrode, the nickel plates may be constructed of a more simple construction (e.g. a conventional pasted nickel oxide configuration) and still maintain satisfactory cycle life.

(2) Zinc-containing plate

Like the nickel plate, the zinc active anode is preferably (though not limited to) flexible, non-self-supporting and capable of being spirally wound or otherwise made to accept a desired configuration and to allow pressure stacking with relation to the rest of the cell contents as confined within the finished cell. The zinc electrode is not limited to, but preferably is composed of a thin sheet or grid substrate pasted, sintered, impregnated or otherwise securely made active with a uniform bonded layer or covering of a zinc-active material.

The substrate typically may be a sheet of flat-grid structure such as woven wire screen, perforated sheet metal, et cetera, or expanded mesh (of iron, steel or other conductive metal), which is preferred because of low cost and desired characteristics. The substrate should provide a long lasting base onto which the zinc-active material remains firmly in electrical contact, electrochemically active and reversible throughout the life of the battery.

Pasting is a preferred method of applying active zinc to the substrate. Conventional processes and paste mixtures are within the scope of the present invention. A preferred paste formulation consists of preferably from about 25 to about 99 and more preferably from about 35 to about 85 weight percent of relatively pure zinc powder and about 15 weight percent or less of mercuric oxide (or a functionally similar compound) mixed with a suitable binder, such as an aqueous solution of sodium carboxy, methylcellulose or like material. Zinc oxide may also be incorporated, preferably in amounts from about 10 to about 60 weight percent of the formulation. Enough binder should be employed to blend the components into a smooth paste.

Once the paste has been applied to the substrate, such as by molding the paste on the substrate using an extrusion apparatus, and allowed to dry, it is important that the surface of the plate be relatively smooth so that a substantially invariant interface with adjacent separator is attained. It is often desirable to pressure mold the zinc-active material to the substrate followed by a polishing step to achieve necessary smoothness. However, the degree of smoothness required of the plate generally depends inversely on the ability of the separator material to deform, bend, and otherwise intimately follow the contour of the surface of the electrode plate. Thus, the paste may be pressure extruded onto the grid through a die of desired slit width, and retain necessary smoothness in most instances. Substantial absence of occluded voids along the interface prevents appreciable dendritic growth and greatly prolongs cell life.

It is desirable to use an excess of reducible zinc active material, e.g. ZnO, with respect to the amount of oxidizable cathode material present to minimize hydrogen evolution (and rupture of the cell) from the zinc plate during charge and overcharge. If this precaution is not heeded, or if for some reason abnormally excessive gas pressure builds up, an auxiliary electrode system may be necessary for degassification.

(3) Separator

The multi-layered separator of the present invention is uniquely adapted to retard dendritic growth therethrough. In general, the separator layers are interposed between the electrodes of opposite polarity, permitting adequate electrolytic conduction between electrodes, but preventing metallic conduction.

The first separator layer, contiguous to the negative electrode is microscopically uniform and is essentially non-reticulated, i.e., even under magnification of 100 times or more, there is no visual noticeable three dimensional network of veins, fibers or crossing lines which would form a channeled matrix to house pools of electrolyte (containing zincate ions) through which dentrites could easily propagate. Essentially, this first layer is a microporous, non-woven material having a permeability to air of from about 0.1 to 100, more preferably from about 0.5 to about 50 and most preferably 2.0 to about 10 cubic feet per minute per square foot of separator per ½ inch water pressure differential. In addition, this first separator layer has a high affinity for electrolyte through adhesion, absorption, adsorption, capillarity or by actual chemical attraction. This retentive nature of the separator layer has been found to be essential in maintaining homogeneity of wetness along the zinc electrode surface to which the separator is in intimate contact. Of particular importance, and distinct from conventional separators, is the ability of electrolyte to strongly adhere to the separator material. The separator layer retains electrolyte (35 weight percent KOH) in the amount preferably from about 0.55 to about 0.95 and more preferably from about 0.7 to about 0.9 gram of electrolyte per cubic cm. of separator and included electrolyte.

It is important that this first separator layer, when placed in pressure engagement with the zinc electrode plates, to intimately follow and conform to the contour of the zinc plate, i.e., interfacial voids either do not exist or are so small as to be ineffective so that localized excesses of electrolyte do not occur to any appreciable extent. It is also important for this reason to never wrap separator material around sides of the zinc plate for this creates voids and pockets at those points promoting build-up of localized excesses of electrolyte. Likewise, wrapping the nickel plate may severely restrict oxygen from migrating to the zinc plate to recombine and oxidize any dendrites present.

Examples of preferred separators include cellulose materials, particularly cotton cellulosic materials, such as microporous high grade filter papers, i.e. filter papers which resist attack by alkaline electrolyte, and are resistant to oxidation. As differentiated from most conventional separators for alkaline cells, the preferred separators of the present invention are composed of fibers having a degree of polymerization preferably at least about 3500, and more preferably at least about 7500. (See High Polymers, V5, "Celulose and Cellulose Derivatives," Interscience Publishers, 1954.) By degree of polymerization is meant the number of anhydroglucose units per molecule.

The second separator layer, contiguous to and in pressure engagement with the positive electrode may be the same or similar material as used for the first separator layer. If this embodiment is employed, a semi-permeable membranous material is sandwiched between the first and second layers, as hereinafter defined. In another embodiment of the invention, the layer immediately adjacent to the positive electrode should be of a large pore, open, non-absorbent material relative to the first separator layer. Woven or non-woven materials, such as hydrophilic nylon (Pellon), glass wool, fibrous plastic, and relatively porous filter papers may be employed for this large pore layer. It is still important that the fibres in this layer be wetted by the cell electrolyte to some extent. The retention of this layer to electrolyte is preferably less than about 0.55. In operation, this porous, less absorbent separator layer tends to become less wetted than the first separator layer, and readily conducts oxygen through its capillary pores and laterally along the surface of the electrodes to be eventually reunited with the zinc electrode (anode oxidation). This provision for oxygen recombination probably allows oxidation of any trees branching from the anode.

Either the first or the second separator layers hereinabove defined may be composed of additional individual separators providing adjacent sub-layers of the same or like material. In any event, there will be a boundary within the overall separator in which a more porous separator layer is contiguous to a non-reticulated separator layer providing an interface between materials of varying character.

The third separator layer is comprised of a semi-permeable membranous material. Typically, this membrane is a film formed from thermoplastic materials, for example polyvinyl alcohol, polyvinyl acetate, cellulose, polyvinyl butyral, polystyrene and various forms of nylon. Regenerated cellulose, e.g. cellophane, is preferred. Certain of the materials are not naturally permeable in film form, but may be made so, as by incorporating a soluble salt or a plasticizer which can be subsequently leached out of the film. In order to make porous films of either ethyl cellulose or polystyrene which are not naturally permeable in film form, inorganic sulfates such as potassium sulfate may be incorporated in the films as the salts may readily be leached out of the film. Other conventional membranes may be employed. Also, two or more membrane layers may be used, although one is generally sufficient and preferred.

In another embodiment the separator is composed of two outer separator layers made of the same or like materials enclosing a semi-permeable membranous separator layer. This configuration permits transverse variance in the separator material characteristics (e.g. porosity, wetness) which is highly advantageous in retarding zinc growth between electrodes. In this separator embodiment, oxygen recombination is adequately provided because of the relative minimum of electrolyte present in the separators. It is believed that oxygen leaving the positive electrode has a much greater probability of recombining at zinc negative electrode when only this minimum amount of electrolyte is present.

Zinc dendritic growth between electrodes is further retarded by constructing the separators so that they overhang or extend beyond the edges of the electrodes. Heretofore, many zinc cell failures have occurred because of shorting between electrode edges. It has been found that extending the separator creates a very circuitous and difficult path over which the zinc growth must follow (i.e. up and over the extended separator layer) in order to reach the now rather remotely positioned positive electrode.

(4) Electrolyte

Alkaline electrolyte is preferably employed. The electrolyte preferably provides a source of hydroxyl ions which participate in the electrochemical reactions at the respective plates. While the discharge reactions which take place at the cathode (in this case, nickel) and zinc anode are believed to be as follows, the reactions are not completely understood and the invention should not be so limited:

$$NiOOH + H_2O + e^- \rightarrow Ni(OH)_2 + OH^- \text{ (cathode)}$$

$$Zn + 2OH^- \rightarrow Zn(OH)_2 + 2e^- \text{ (anode)}$$

The charge reactions are the reverse of the discharge reactions. Preferred electrolytes include alkaline earth metal hydroxides such as calcium hydroxide and strontium hydroxide; and alkaline metal hydroxides exemplified by sodium hydroxide, potassium hydroxide, lithium hydroxide, rubidium hydroxide and cesium hydroxide.

Most preferred because of economics and disassociation characteristics is potassium hydroxide in concentrations of preferably from about 20 to about 45 weight percent aqueous solution, although somewhat less or greater concentrations may be employed. Compatible, non-reaction-interfering additives may be utilized, including but not limited to corrosion inhibitors and solubility controlling agents such as potassium carbonate (see U.S. Pat. No. 3,485,673 to Jost), et cetera.

As previously discussed, the amount of electrolyte employed is critical. Only enough electrolyte should be present to wet the cell and support electrolytic conduction between the plates. A nearly dry or damp condition is preferred, although somewhat more or less wetting is operative. The balance must be obtained between adequate electrolytic conduction and minimum zinc dendritic growth. This starved electrolyte condition not only greatly reduces zinc dendritic growth (as evidenced by the excellent recycle life of these cells) but also eases oxygen recombination with the zinc plate, and oxidation of any dendrites present. Normally, all of the electrolyte within the cell is absorbed and retained within the pores and interstices of the separator layers and electrode plates; this condition is independent of the attitude of the cell. To insure proper controlled addition of electrolyte, the addition is advantageously done under the influence of vacuum.

(5) Cell assembly

The cell assembly configuration will be more completely understood by referring to the accompanying drawings wherein like numerals in the various figures denote like parts. It should be understood that many conventional assembly configurations are applicable to this invention.

Referring to the figures, the inner cell components comprised of positive electrode 4, negative electrode 2, and separator 6, saturated to near dampness with 35% KOH, are constrained within cylindrical cell casing 8 having a safety valved top 10. The separator 6 is composed of three layers 24, 26, and 28. Layer 28 is microporous, highly uniform strip of high grade filter paper having a permeability to air of about 4.7 cubic feet per minute per square foot of separator per ½ inch water pressure differential. Layer 24 is contiguous to the nickel electrode and is a single layer of a relatively non-retentive, highly porous strip of Pellon (a trademark of the Pellon Company). Separator layers 24 and 28 are sandwiched about a single layer of cellophane 26.

The multi-layer separator strip 6 and nickel plate 4 are machine spirally wound on a machine under a pressure of about 300 p.s.i. to give a tightly wound concentric configuration. FIG. 2 is a cutoff diagrammatic view of a partial section taken along section 2—2 of FIG. 1. The cylindrical axial void 12 represents the space vacated by the mandrel on which the stacked cell contents are wound. In general, the stacking pressure is firm, sufficient to minimize the occurrence of voids. The stack pressure will depend on the cell configuration, particularly the type of electrode plates used. Preferably at least about 100 and more preferably from about 250 to about 1000 p.s.i. are employed. We have found that this minimum stack pressure is highly beneficial in reducing dendrite growth, apparently because firm stack pressure reduces greatly the presence of pockets and voids within the separator and along the zinc plate/separator interface.

The spirally wound package in FIG. 2 is tightly constrained to prevent unwinding or slippage, and is then inserted into the steel cylindrical container 8. The spiral wound components may alternatively be wound and compressed into oval, rectangular or other shapes to accommodate the ultimate shape desired. The can is preferably electrically insulated in some way, coated with a plastic layer, polyvinyl chloride, polytetrafluoroethylene or some other insulating material though not so limited. Alternatively, the entire can 8 may be made of a suitable electrically inactive material, such as plastic. Metal conductive tabs for current collection (not shown) respectively are attached to and extend from the anode to the steel can 8 and from the cathode to the under side of the top 10, where they are separated by some suitable hermetically sealing insulator material such as rubber or plastic. Thirty-five percent KOH is added under vacuum until the cell stack is very slightly damp, making sure that no free electrolyte is present. The top is preferably secured to the can by crimping its edges over the mouth of the can. The top 10 preferably contains a suitable safety valve (not shown) for discharging excessive gas pressure above a predetermined minimum value which may build up in the cell (e.g. as a result of an excessive charge) but such a build-up is rare and hermetically sealed cells may be in some instances be useable, though not preferred for safety reasons. Paths for oxygen transfer and recombination are provided by space 22 at the bottom of the cell, a like space near the top of the cell (not shown) and the cylindrical axial void 12. The void space 22 is further beneficial in preventing the localized build-up of electrolyte and formation of zincate pools.

In FIGS. 3 and 4 certain preferred separators of the present invention are depicted. In FIG. 3, any of strips 28, 24, and 26 may be composed of a number of the same or like strips. However, it is generally preferred to use only one strip of semi-permeable membrane 26 to present a barrier to zinc growth yet allow adequate conduction of ions. In FIG. 4, the two layer separator is shown where the first layer 32 is a microporous filter paper layer which closely engages the zinc electrode, and a strip of Pellon 30 separates the filter paper layer from the positive electrode. Each of these layers 30 and 32 may be composed of a plurality of contiguous strips of the same or like character.

In FIG. 5, the interface 5 separating zinc electrode 2 from first separator layer 28 is depicted where the view is blown up to about 100 times its actual size. The separator strip 28 intimately follows the contour of the zinc plate 2 and no voids are visibly present. The filter paper strip 28 and cellophane membrane 26 extend beyond the edge of zinc plate 2, discouraging dendritic growth around the top and bottom of the separator layers. Oxygen recombination path is shown. Normally the cellophane layer 26 is essentially impermeable to oxygen transfer.

(6) Examples

While the following working examples illustrate certain preferred aspects of the invention, the invention is not thereby limited to these illustrations:

Example I

A sealed pillbox cell contains a single conventional sintered nickel plaque cathode and an anode consisting of an expanded mesh of metal pasted with a pliant mixture of zinc powder, zinc oxide and mercuric oxide. The separator consists of three layers. Adjacent the zinc plate is a single layer of a fibrous mat of vegetable parchment paper, microscopically uniform. The remaining two layers consist of Viskon 3011 (manufactured by the Chicopee Mills, Inc.), which is a bonded cellulosic nonwoven material, substantially more porous and permeable to air than the paper layer adjacent the anode. The cell is compressed to two-thirds (⅔) p.s.i. and repeatedly discharged (50% level) and charged. The cycle life is determined to be 122 cycles.

Example II

The same type of cell is constructed as in Example I except that two cathodes lie on either side of the single anode, and the separators are composed of two layers of high grade uniform filter paper (permeability to air 7.0 cfm.) enclosing a membranous layer of regenerated cellulose (cellophane). The mid life voltage is about 1.6 and cycle life found to be 223 cycles.

Example III

The same cell as used in Example II is employed except that two anodes and one cathode are used, the cell is pressurized to 500 p.s.i. stack pressure, and the depth of discharge is between 50 and 80% of capacity. The cell life is 220 cycles.

Example IV

As a comparison, a cell very similar to that of Example II is constructed, with the separator composed of four layers of high grade filter paper. The depth of discharge is 25%. The cycle life is only 13 cycles. This example demonstrates the advantages of transverse variance in separator materials, typified by the separators of Examples I, II, and III.

(7) Modifications of the invention

It should be understood that the invention is capable of a variety of modifications and variations which will be made apparent to those skilled in the art by a reading of the specifications which are to be included within the sphere of the claims appended hereto. One such modification would embody the use of a series of horizontally parallel stacked plates and separators, rather than the spirally wound cell depicted in the drawings of the present invention. Other geometrical configurations may be useful with this invention and will be apparent to those skilled in the art.

What is claimed is:

1. An alkaline electrolyte-containing secondary electrochemical cell comprising:
   (a) at least one zinc-containing negative electrode;
   (b) at least one positive electrode in spaced relationship to the zinc containing electrode, said space containing an interelectrode multilayered separator;
   (c) a first non-reticulated separator layer, contiguous to and in pressure engagement with the zinc-containing electrode, having microscopic uniformity, and having the property of highly retaining and absorbing electrolyte within the pores of the separator, providing an interface between separator and zinc electrode which substantially lacks occluded voids and where said negative electrode is substantially uniformly wetted by the electrolyte;
   (d) a second separator layer, less retentive of electrolyte than said first separator layer, contiguous and in pressure engagement with the positive electrode, and having a greater porosity than said first separator layer;
   (e) electrolyte absorbed and retained by said separator layers to the extent that substantially no free electrolyte is present between the electrodes, but in an amount sufficient to provide homogeneous wetness of the negative electrode and sufficient to accommodate electrochemical conduction between the electrodes;
   (f) a container encapsulating said electrodes, separators and electrolyte under firm stacking pressure, and
   (g) means for externally withdrawing current from electrodes of opposite polarity within the cell.

2. The cell of claim 1 wherein the positive electrode contains nickel.

3. The cell of claim 1 wherein the first separator retains and absorbs electrolyte by adhesion, capillarity, or by chemical attraction to a greater degree than the second separator.

4. The cell of claim 1 wherein said first separator layer is comprised of a plurality of contiguous layers, where each contiguous layer has the properties of said first separator layer.

5. The cell of claim 1 wherein said second separator layer is comprised of a plurality of contiguous layers, where each contiguous layer has the properties of said second separator layer.

6. The cell of claim 1 wherein a third separator layer of semi-permeable membranous material is interposed between said first and second separator layers.

7. The cell of claim 1 wherein the first separator layer consists of cellulose material having a degree of polymerization of at least 3500.

8. The cell of claim 6 wherein the third separator layer extends beyond the outer edges of the first or second separator layers, so as to retard zinc dendritic growth between the electrodes.

9. An alkaline electrolyte containing secondary normally sealed electrochemical cell comprising:
   (a) at least one zinc containing negative electrode;
   (b) at least one positive electrode in spaced relationship to the zinc containing electrode, said space containing an interelectrode multi-layered separator;
   (c) a first non-reticulated separator layer, contiguous to and in pressure engagement with the zinc containing electrode, having microscopic uniformity and having the property of highly retaining and absorbing electrolyte within the pores of the separator, providing an interface between separator and zinc electrode which substantially lacks occluded voids and where said negative electrode is substantially uniformly wetted by the electrolyte;
   (d) a second separator layer having the same general characteristics as the first separator layer, contiguous and in pressure engagement with the positive electrode;
   (e) a third separator layer consisting of a membrane permeable to electrolyte but substantially impermeable to electrode-derived metallic species, interposed between said first and second separator layers;
   (f) electrolyte absorbed and retained by said separator layers to the extent that substantially no free electrolyte is present between the electrodes, but in an amount sufficient to provide homogeneous wetness of the negative electrode and sufficient to accommodate electrochemical conduction between the electrodes;
   (g) container encapsulating said electrodes, separators and electrolyte under firm stacking pressure, the edges of said electrodes being spaced away from said container; and
   (h) means for externally withdrawing current from electrodes of opposite polarity within the cell.

10. The cell of claim 9 wherein the positive electrode contains nickel.

11. The cell of claim 9 wherein said first and second separator layers are comprised of at least one layer of high-grade microporous filter paper layers.

12. The cell of claim 9 wherein at least one of the separator layers extends beyond the outer edges of the electrodes so as to retard zinc dendritic growth between the electrodes.

13. The cell of claim 9 wherein the semipermeable membrane consists of at least one layer of regenerated cellulose.

14. The cell of claim 9 wherein the cell contents form a spirally wound electrode separator structure.

15. A multi-layer separator for use in an alkaline rechargeable battery cell having a zinc anode comprising:
   (a) a first non-reticulated microporous separator layer to be placed next to said zinc anode and having a permeability to air of from about 0.1 to about 100 cubic feet per minute per square foot of separator, said separator consisting of a cellulosic material having a degree of polymerization of at least 3500 and highly retentive of said electrolyte;
   (b) a second separator layer to be placed next to the positive electrode of said cell, and having the same properties as said first layer; and
   (c) a third separator layer comprising a membranous material permeable to electrolyte but substantially impermeable to electrode-derived metallic species.

16. In a normally sealed, rechargeable nickel-zinc cell containing alkaline electrolyte, a positive nickel electrode plate, a negative zinc electrode plate and inter-electrode separator the improvement comprising the combination of:
- (a) a multi-layered separator, the first and second layers immediately adjacent to the zinc and nickel plates, respectively, composed of microporous high grade cellulosic papers having a degree of polymerization of at least 3500, and highly retentive of alkaline electrolyte;
- (b) a third layer interposed between said first and second layers and consisting of semi-permeable membranous material which is permeable to electrolyte, but substantially non-permeable to metallic species emanating from the electrode plates;
  said electrode plates and included separators existing under firm stacking pressure whereby the interface formed between said zinc plate and said first separator layer is substantially free of occluded voids;
- (c) electrolyte absorbed and retained by said separator to the extent that substantially no free electrolyte is present between the electrodes, but present in extent sufficient to provide a substantially homogeneous wetting of the zinc electrode; and
- (d) a container for encapsulating and constraining the plates and separators to maintain the stacking pressure relationship between the electrode plates and separators, the edges of said plates and separators being spaced away from the container a sufficient distance to provide for gaseous migration and recombination with the plates and to inhibit formation of wetting paths which would be conducive to dendrite propagation.

References Cited
UNITED STATES PATENTS

| | | | |
|---|---|---|---|
| 2,890,261 | 6/1959 | Andre | 136—9 |
| 2,655,552 | 10/1953 | Fuller et al. | 136—145 |
| 2,610,219 | 9/1952 | Yardney | 136—6 |
| 3,485,673 | 12/1969 | Jost | 136—30 X |
| 2,511,887 | 6/1950 | Vinal | 136—145 |
| 2,994,728 | 8/1961 | Herold | 136—9 |
| 3,097,975 | 7/1963 | Horn et al. | 136—145 |
| 3,226,260 | 12/1965 | Drengler | 136—30 |
| 3,450,566 | 6/1969 | Solomon et al. | 136—6 |

ANTHONY SKAPARS, Primary Examiner

U.S. Cl. X.R.

136—145